(No Model.) 2 Sheets—Sheet 2.

C. D. LIPSCOMB.
MUZZLE.

No. 533,476. Patented Feb. 5, 1895.

Witnesses
F. M. Johnson
H. J. Riley

Inventor
Cicero D. Lipscomb
By his Attorneys,
C. A. Snow & Co.

UNITED STATES PATENT OFFICE.

CICERO D. LIPSCOMB, OF LLOYD, TEXAS.

MUZZLE.

SPECIFICATION forming part of Letters Patent No. 533,476, dated February 5, 1895.

Application filed April 5, 1893. Renewed June 20, 1894. Serial No. 515,193. (No model.)

*To all whom it may concern:*

Be it known that I, CICERO D. LIPSCOMB, a citizen of the United States, residing at Lloyd, in the county of Denton and State of Texas, have invented a new and useful Muzzle, of which the following is a specification.

The invention relates to improvements in muzzles.

The object of the present invention is to provide a simple and effective muzzle adapted to be readily applied to a horse or similar animal, and capable of preventing an animal eating while its head is erect, and adapted to open to permit grazing when its head is lowered, whereby an animal may be allowed to graze in a field, orchard or the like, without liability of its eating or damaging fruit or plants.

The invention consists in the construction and novel combination and arrangement of parts hereinafter fully described, illustrated in the accompanying drawings and pointed out in the claims hereto appended.

Figure 1:
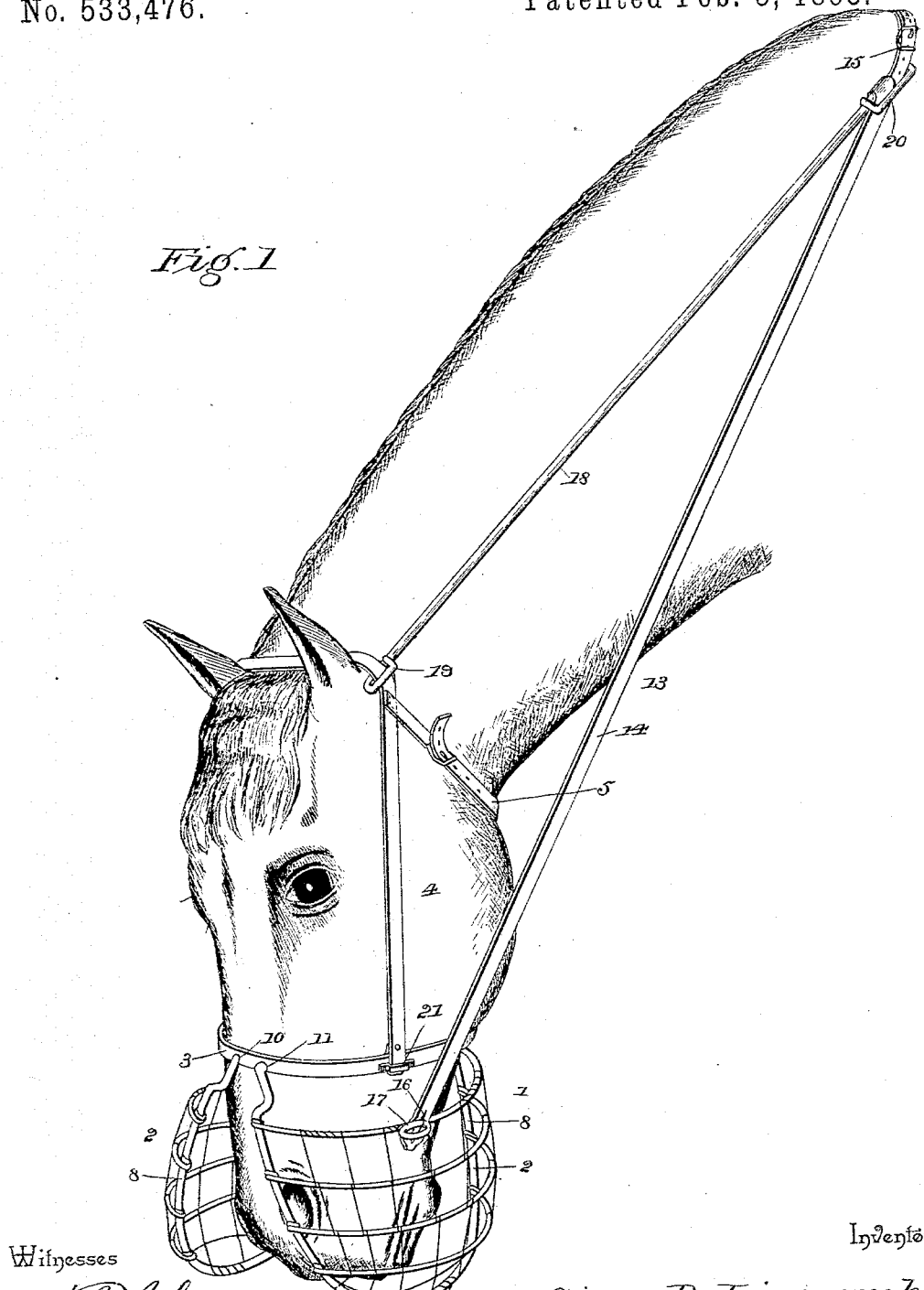
Figure 2:
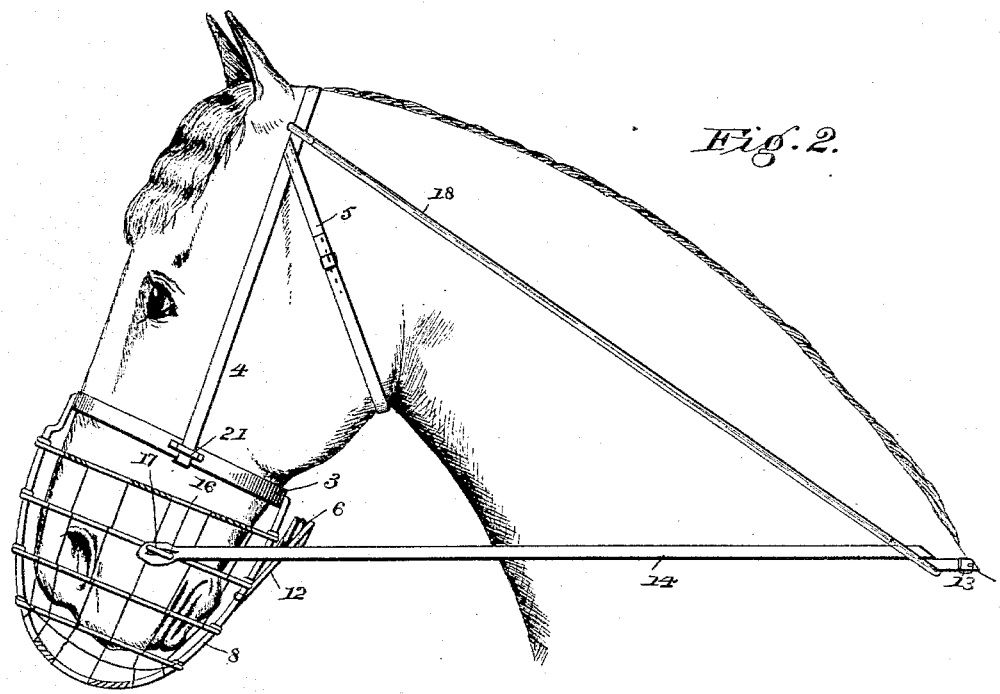
Figure 3:
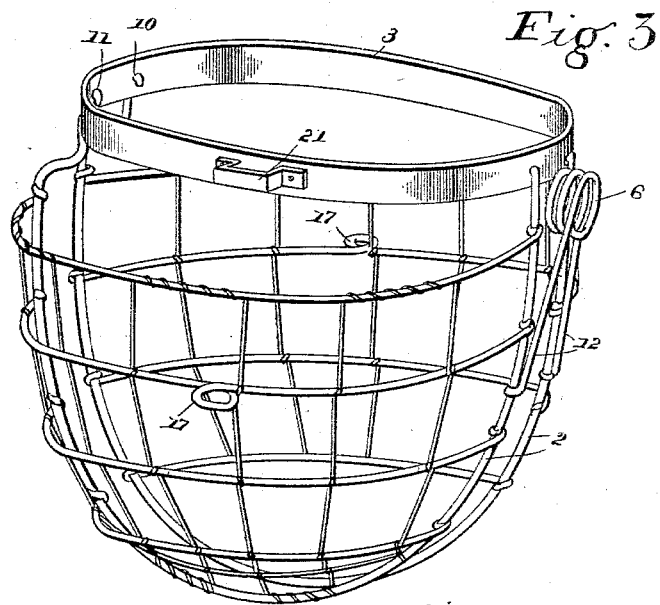

In the drawings—Figure 1 is a perspective view of a muzzle constructed in accordance with this invention and shown applied to a horse, the animal's head being lowered. Fig. 2 is a side elevation of the same, the animal's head being raised. Fig. 3 is a perspective view of the muzzle detached.

Like numerals of reference indicate corresponding parts in all the figures of the drawings.

1 designates a muzzle composed of similar opposite sections 2 hinged to a nose band 3 of sheet metal, which is adapted to encircle the nose of an animal and to form the nose band of a bridle or halter composed of a head stall 4 and a throat latch 5. The sections are concavo-convex and are constructed of woven wire, and are held closed by a spiral spring 6 when the head of the animal is elevated. The binding or stiffening wire 8 at the meeting edges of each section has its ends extended and secured in perforations 10 and 11 of the band 3 and bent or otherwise secured at the inner face of the same, whereby the sections of the muzzle are hinged and adapted to swing laterally to leave the mouth of the animal free for grazing, when its head is lowered. The spiral spring is arranged at the bottom of the muzzle and consists of a coil, the ends of which are extended to form arms 12, which are secured to the sections 1 of the muzzle.

The sections of the muzzle are opened or spread laterally, when the head of the animal is lowered for grazing, by an operating strap 13, which is composed of two sections 14 having their front ends detachably secured to the sections of the muzzle, and their rear ends adjustably connected by a buckle 15. The front ends of the sections are provided with eyes or openings 16, which are buckled over outwardly extending loops 17 of wires of the muzzle. The operating strap extends rearward from each muzzle-section, and passes over the back of the animal at the base of the neck or over the neck close to the base in order that the animal in lowering its head for grazing will draw on the strap, which being unyielding will cause the section to open against the action of the spring. But, as soon as the head of the animal is raised, the tension on the strap is removed, and the spring operates and closes the muzzle to prevent an animal eating fruit or the like. The position of the operating strap is maintained by a pair of rods 18 extending along the neck of the animal at the sides thereof, and terminating in upper and lower eyes 19 and 20. The upper eyes are arranged on and receive the head stall of the halter, and the lower eyes receive and have twisted around their sides the sections of the operating strap. By passing each section around one of the sides of an eye, the lower end of the rods are prevented slipping on the operating strap.

It will be seen that the muzzle is simple and inexpensive in construction, and adapted to be readily applied to an animal, and that it is capable of preventing it eating with its head elevated and of permitting it to graze freely when its head is lowered.

The ends of the head stall are provided with loops which receive the sides of the band 3; and they are prevented slipping or moving from the proper position by keepers 21.

Changes in the form, proportion and the minor details of construction may be resorted to without departing from the principle or sacrificing any of the advantages of this invention.

What I claim is—

1. The combination of a muzzle having two hinged sections arranged to swing apart laterally, a spring for holding the sections together, a halter for attaching the muzzle to the head of an animal, an operating strap for passing over the back of an animal having its ends attached to the sections of the muzzle, and rods extending from the top of the halter to the operating strap to maintain the latter in proper position, substantially as described.

2. The combination of a nose band, laterally swinging muzzle sections hinged to the nose band and provided with loops extending outward, a halter secured to the band, a spring for holding the muzzle-sections closed, an adjustable operating strap provided at its ends with eyes buttoned over the loops, and the rods for maintaining the operating strap in proper position provided at their ends with eyes receiving the halter and the operating strap, substantially as described.

In testimony that I claim the foregoing as my own I have hereto affixed my signature in the presence of two witnesses.

CICERO D. LIPSCOMB.

Witnesses:
ALBERT REYNOLDS,
W. C. SPOON.